US005931390A

United States Patent [19]

Hoffmann et al.

[11] Patent Number: 5,931,390

[45] Date of Patent: Aug. 3, 1999

[54] VALVE FOR THE DOSED DISCHARGE OF FLUIDS

[75] Inventors: Karl-Heinz Hoffmann; Gregor Renner, both of Stuttgart; Friedrich Wirbeleit, Esslingnen; Jens-Peter Wobbe, Simmertal, all of Germany

[73] Assignees: Daimler-Benz AG, Stuttgart; P&S Prolotypen und Sondermaschinen GmbH, Bad Kreuznach, both of Germany

[21] Appl. No.: 09/007,562

[22] Filed: Jan. 15, 1998

[30] Foreign Application Priority Data

Jan. 16, 1997 [DE] Germany ........................... 197 01 288

[51] Int. Cl.[6] ..................................................... F16K 31/02

[52] U.S. Cl. ............................................ 239/562; 239/584

[58] Field of Search ..................................... 239/584, 562, 239/548, 456, 459; 251/129.06

[56] References Cited

U.S. PATENT DOCUMENTS

| | | | |
|---|---|---|---|
| 4,502,196 | 3/1985 | Kupper et al. | 239/397.5 |
| 4,669,660 | 6/1987 | Weber et al. | 239/397.5 |
| 4,750,706 | 6/1988 | Schlagmuller | 251/129.06 |
| 4,863,105 | 9/1989 | Bennet | 239/397.5 |
| 5,031,841 | 7/1991 | Schafer | 251/129.06 |
| 5,479,902 | 1/1996 | Wirbeleit . | |
| 5,810,255 | 9/1998 | Itoh et al. | 251/129.06 |

FOREIGN PATENT DOCUMENTS

| | | |
|---|---|---|
| 0 218 895 | 12/1988 | Germany . |
| 195 00 706 | 7/1996 | Germany . |
| 2 193 386 | 2/1988 | United Kingdom . |
| 2 296 940 | 1/1996 | United Kingdom . |

*Primary Examiner*—Kevin Weldon
*Attorney, Agent, or Firm*—Klaus J. Bach

[57] ABSTRACT

In a valve for the dosed discharge of fluids particularly a fuel injection valve for fuel injection systems of internal combustion engines, the valve includes in an valve housing at the front end of an injector housing a valve structure at a fluid discharge end of the valve housing and a stack of piezo elements disposed in the opposite end of the injector housing and a high pressure fluid passages leads to the fluid discharge end which is isolated from the area in which the stack of piezo elements is disposed and which is in communication with a low pressure drain passage such that the piezo elements are not exposed to the high pressure fluid. Isolation is obtained by a compensation cylinder movably disposed in an annular space between, and in sealing relationship with, the valve housing, the piezo stack being enclosed in a piezo guide tube which is sealingly connected to the valve housing.

11 Claims, 4 Drawing Sheets

VALVE FOR THE DOSED DISCHARGE OF FLUIDS

BACKGROUND OF THE INVENTION

The invention resides in a valve for the dosed discharge of fluids, particularly an injection valve for fuel injection systems of internal combustion engines wherein the valve is operated by a stack of piezo elements.

DE 195 00 706 A1 discloses a fuel injection valve for internal combustion engines, which valve includes a hydraulic stroke amplifier for increasing the stroke length of a piezo electric actuator. In this valve, fluid supply passages and fluid return passages are separated. The fluid is supplied to an annular space by way of a passage disposed in the valve housing.

It is however, a disadvantage that, during the supply of the fuel to the annular space, the passage subjects the fuel injection valve to bending tensions.

EP 0 218 895 B1 relates to a dosing valve for dosing fluids. This prior art dosing valve includes a piezo electric control member and a stack of piezo elements of a length that can be changed by the application of a control voltage. At one end, the stack of piezo elements is connected to a valve needle, and, at its opposite end, it is exposed to a liquid-filled damper space delimited by a damper piston. The damper piston is movable in the direction of the axis of the stack of piezo elements and is so designed and arranged in a housing that it is firmly held in position relative to housing when the length of the stack of piezo elements is changed by the control voltage applied thereto. By a contraction of the stack of piezo elements, the valve needle is lifted of the valve seat.

In this arrangement, the fuel to be injected into the combustion chamber of the internal combustion engine is supplied to the end of the valve housing remote from the combustion chamber and, from there, flows through a passage to the annular space which is formed between the lower end portion of the valve and the stack of piezo elements disposed therein. From here, the fuel is conducted to another annular space which is limited by the valve housing wall and the valve needle. Then the fuel flows into an annular space adjacent the valve discharge opening closed by the valve needle.

In this arrangement, the stack of piezo elements is exposed directly to the pressure of the fuel supplied to the valve. This pressure has a value of ca. 1000 bar so that the stack of piezo elements is compressed and shortened to such a degree that an accurate functioning of the valve is not insured because of the control length loss of the stack of piezo elements under pressure.

In addition, the injection time for the injection of the fuel into the combustion chamber is not accurately controllable since, after lift off of the valve needle from the valve seat, the fuel enters through the gap formed thereby into the combustion chamber in an uncontrolled manner.

It is the object of the present invention to provide a valve which permits ejection of a fluid in a well defined manner and to insure accurate operation of the piezo-electric valve even at very high injection pressures.

SUMMARY OF THE INVENTION

In a valve for the dosed discharge of fluids particularly a fuel injection valve for fuel injection systems of internal combustion engines the valve includes in an injector housing a valve structure at a fluid discharge end of the injector housing and a stack of piezo elements disposed in the opposite end of the injector housing, and a high pressure fluid passages leads to the fluid discharge end which is isolated from the area in which the stack of piezo elements is disposed and which is in communication with a low pressure drain passage such that the piezo elements are not exposed to the high pressure fluid. Isolation is obtained by a compensation cylinder movably disposed in an annular space between, and in sealing relationship with, the valve housing, the piezo stack being enclosed in a piezo guide tube which is sealingly connected to the valve housing. A tubular flow limiter is provided at the valve discharge end to control the fluid discharge from the valve.

The valve housing includes a valve closing mechanism which has a plunger operable by the stack of piezo elements. The valve plunger is surrounded by a valve shaft by which a temperature-dependent length compensation of the valve can be achieved in an advantageous manner without incurring any stress gradients.

The piezo guide structure enclosing the stack of piezo elements in combination with a separating structure spatially separates the fluid supply and the fluid return passages.

In this arrangement, the stack of piezo elements is not subjected to the highly pressurized fuel which is supplied to the valve. As a result, proper functioning of the inverse piezo electric effect of the stack of piezo elements is insured.

The fluid is conducted through the annular space, which is delimited in radial direction by the piezo guide structure and the injector housing, to the area of the valve adjacent the combustion chamber. In this way, the valve is uniformly stressed.

In the annular space which is delimited by the separating structure and the seal member of the valve shaft, the seal member includes a flow limiting structure is provided through which the fluid is injected for example into a combustion chamber when the valve is opened. Preferably, during the injection of the fluid through the flow limiter a well defined fluid injection beam is obtained which provides for a good distribution of the fluid in the combustion chamber of the internal combustion engine.

Preferred embodiments of the invention will be described below on the basis of the accompanying drawings which show the arrangement according to the invention schematically and in principle.

DESCRIPTION OF A PREFERRED EMBODIMENT

Figure 1:
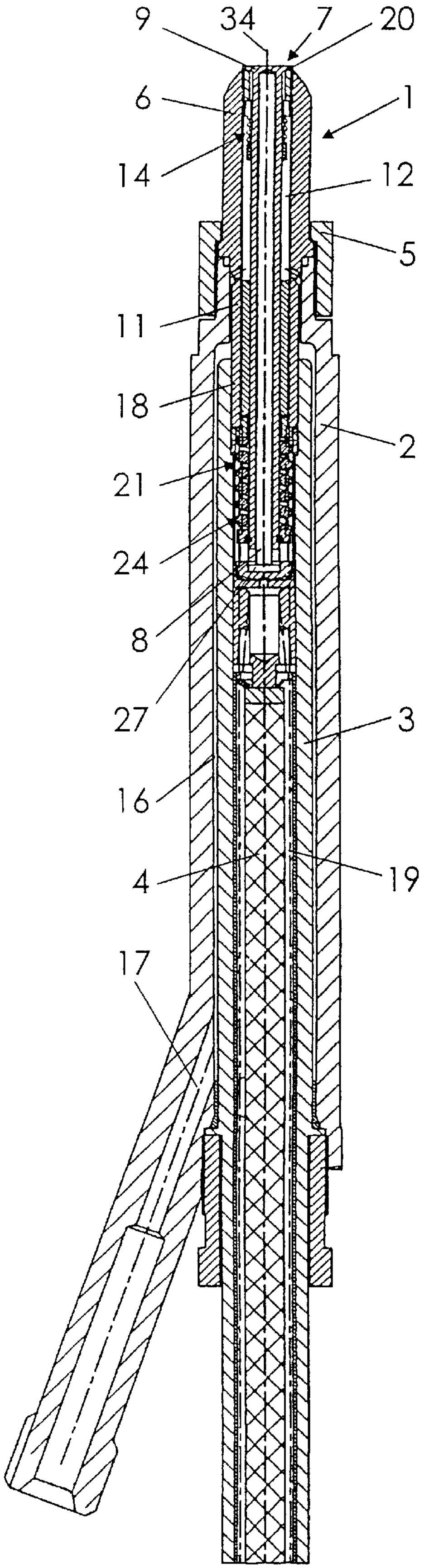
FIG. 1 shows a complete valve for the dosed injection of fuel.

As shown in FIG. 1, a valve 1 for the accurately dosed discharge of fluids, particularly, a fuel injection valve for a fuel injection system of an internal combustion engine consists of an injector housing 2 a piezo guide structure 3 in which a stack 4 of piezo elements is disposed and a valve housing 6 connected to the injector housing 2 by means of a screw cap 5. Furthermore, the valve housing 6 includes a valve closing mechanism 7 which is movably disposed in the valve housing 6.

Figure 2:
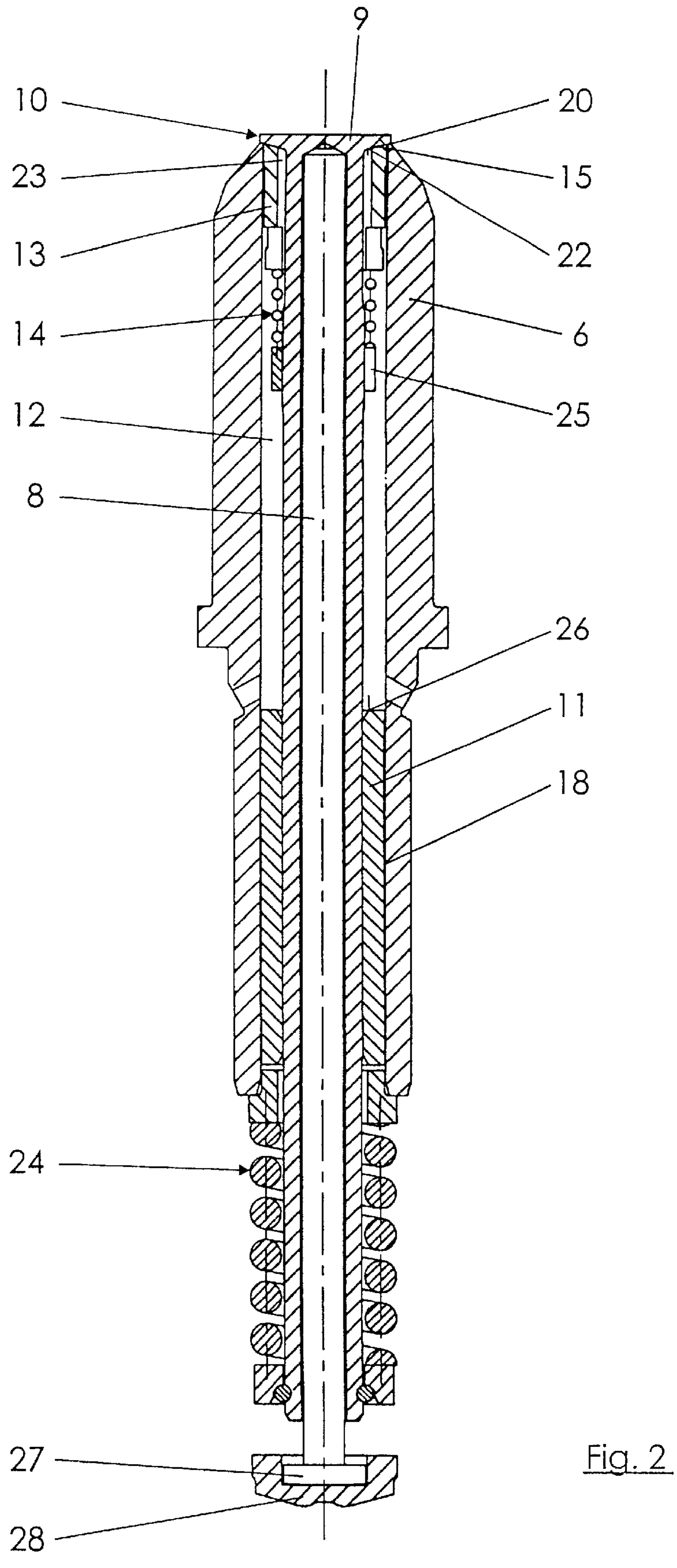
FIG. 2 shows the valve housing portion with the valve closing arrangement and a valve shaft return structure.

The valve closing arrangement comprises a plunger 8 and a valve shaft 9. The plunger 8 is disposed in the cylindrical sleeve-like valve shaft 9. Furthermore, a valve closing member is disposed on the valve shaft 9 at its end adjacent the combustion chamber and forms there a shoulder 10 (FIG. 2).

The valve housing 6, the shoulder 10 and a separating structure which is firmly connected to the valve shaft 9 and which forms a pressure compensation cylinder 11 define an annular space 12 filled with fluid during operation. From this annular space 12, an exactly dosed amount of fluid is injected, by way of a flow limiter 13 into the combustion chamber which is not shown in the drawing but which is disposed at the front end of the injector when it is mounted in the cylinder head of an internal combustion engine. The flow limiter 13 is pressed, by a spring arrangement 14, against a surface area 15 of the shoulder 10 of the valve shaft 9 in such a way that, upon leaving the valve 1 the fluid flows first through the flow limiter 13. The spring arrangement 14 includes a cylindrical stop 25, which is firmly connected to the valve shaft 19.

Between the piezo guide structure 3 and the injector housing 2, there is an annular space 16 to which a fluid supply line 17 leads by way of which fluid is supplied to the valve 1. From there, the fluid flows into the annular space 12. The stack 4 of piezo elements is shielded from the fluid admission by the piezo guide structure 3 and the pressure compensation cylinder 11. The stack 4 of piezo elements is disposed fully in the low pressure area of the fluid return passage and is not affected by the high-pressure fluid supplied to the valve housing.

For the return of the fluid, the valve 1 includes, between the pressure compensation cylinder 11 and the valve housing 6, a narrow gap 18 by way of which the fluid flows out of the annular space 12 toward the stack 4 of piezo elements and then into the annular space 19 which is delimited by the piezo guide structure 3 and the stack 4 of piezo elements. In this way, uniform ambient conditions are generated and the stack of piezo elements is additionally cooled by the return fluid. As a result, large temperatures gradients and consequently temperature differences in the valve 1 which could affect the valve operation by locking of the various components of the valve 1 relative to one another and which could initiate an undesired opening of the valve, are avoided. The fluid exits the annular space 19 at the end of the stack 4 of piezo elements remote from the combustion chamber.

When a control voltage is applied to the stack 4 of piezo elements the stack 4 becomes longer and moves the valve closing mechanism 7 relative to the valve housing 6 by a distance corresponding to the elongation of the stack 4 of piezo elements. With the movement of the valve closing mechanism 7, a gap is generated between the shoulder 10 and a valve seat 20 through which fluid can flow out of the interior of the valve housing 6. After completion of the injection procedure, the control voltage is removed from the stack 4 of piezo elements whose length is then reduced to its original length. The valve closing arrangement 7 is returned at the same time by a valve return structure 21 so as to be sealed again on the valve seat 20 whereby the valve 1 is closed.

FIG. 2 shows the valve housing 6 with the valve closing mechanism 7 and with the valve return structure 21. As can be seen in FIG. 2, the shoulder 10 of the valve shaft 9 has the shape of a closure cone 22 tapering down toward the annular space 12. The cone-like shape of the shoulder 10 improves the guidance for the flow of the fluid out of the annular space 23 and through the flow limiter 13 and permits the injection of the fluid into the combustion chamber in the form of a cone-like beam. The annular space 23 is delimited by the valve shaft 9 and the flow limiter 13.

The valve return structure 21 which comprises a spring arrangement 24 pulls the valve shaft 9 with the shoulder 10 back onto the valve seat 20 after completion of the injection procedure. Instead of using springs the valve shaft 9 can also be returned by providing a certain surface area ratio between the surface area 15 of the shoulder 10 of the valve shaft 9 and the front face area 26 of the pressure compensation cylinder 11 facing the combustion chamber. The surface ratio must be such that when the two surfaces areas 15 and 26 are exposed to the fluid under pressure, a return force acts on the valve closing mechanism—without the spring force of the spring arrangement 24—which return force returns the valve closing mechanism to be seated on the valve seat 20 and consequently closes the valve 1 when no voltage is applied to the stack 4 of piezo elements and the stack 4 is in its shorter state.

At the end remote from the combustion chamber end of the valve 1, the plunger 8 is provided with a flange 27. On the flange 27, there is provided a spherically rounded part 28 in such a way that the plunger 8 can be guided coaxially with the piezo guide structure 3. This prevents tilting of the plunger 8 during transmission of the expansion movement of the stack 4 of piezo elements by a transmission structure 29. The spherically rounded part 28 centers the plunger 8 with the piezo guide structure 3.

Figure 3:
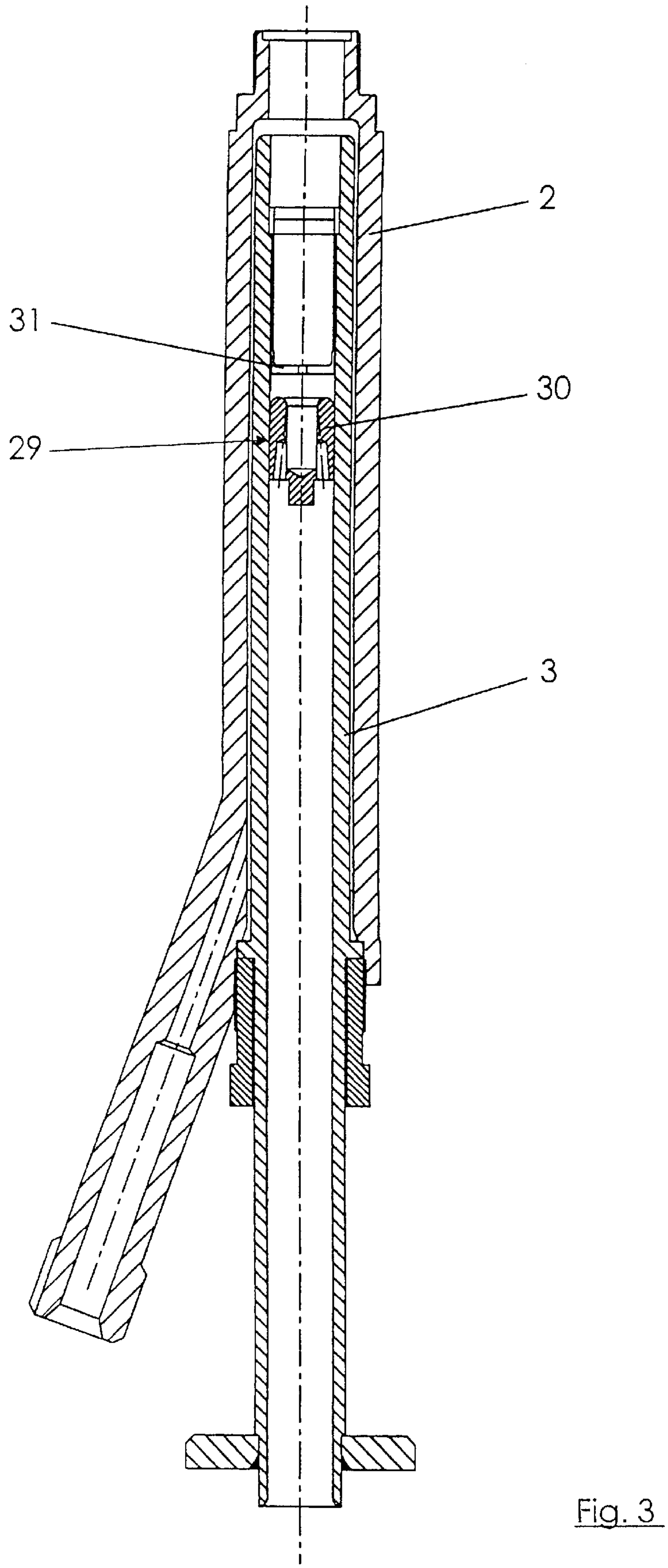
FIG. 3 shows the valve housing with a transmission arrangement including a leverage structure and a pressure sleeve.
Figure 4:
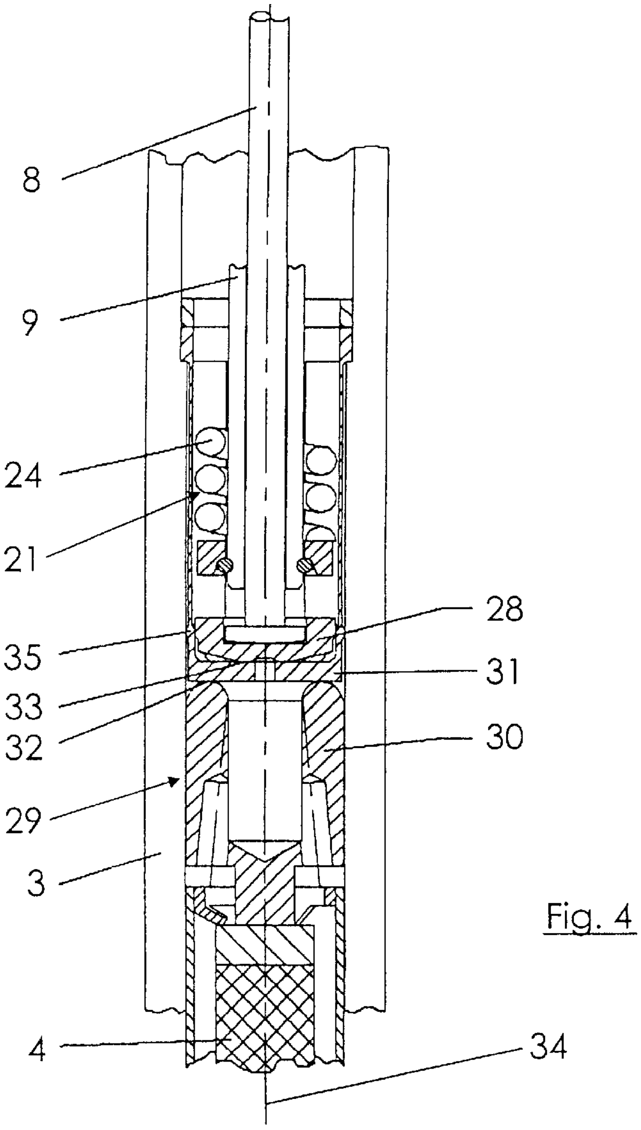
FIG. 4 is an enlarged view showing the leverage structure of FIG. 3 in detail.

FIGS. 3 and 4 show how the expansion movement of the stack 4 of piezo elements is transmitted, by way of the transmission structure 29 and the spherically rounded part 28, to the plunger 8 and consequently to the valve shaft 9. It is the purpose of the transmission structure 29 to amplify the elongation movement of the stack of piezo elements. During the injection process, the stack 4 of piezo elements presses against an adjacent pressure sleeve 30, which presses against a lever structure 31. The pressure sleeve 30 is so shaped that there is an engagement point 32 between the pressure sleeve 30 and the lever structure 31 at a certain distance from the inner surface of the piezo guide structure 3. An engagement point 33 between the lever structure 31 and the spherically rounded part 28 is disposed near the center line 34. The lever structure 31 consists of four equally sized radially arranged components which pivot about a pivot point 35 in the direction of the valve closing mechanisms 7. The pivot point 35 is disposed at the inside of the piezo guide structure 3. The amplification of the elongation of the stack 4 of piezo elements is achieved by the different locations of the two engagement pivot points 32 and 33 between the pressure sleeve 30 and the lever structure 31 and between the lever 31 and the part 28. Pivoting of the lever structure 3' provides for much greater displacement of the valve closing mechanism 7 than the movement which would be obtainable by a direct transmission of the elongation of the stack 4 of piezo elements to the valve closing mechanism 7.

Figure 5:
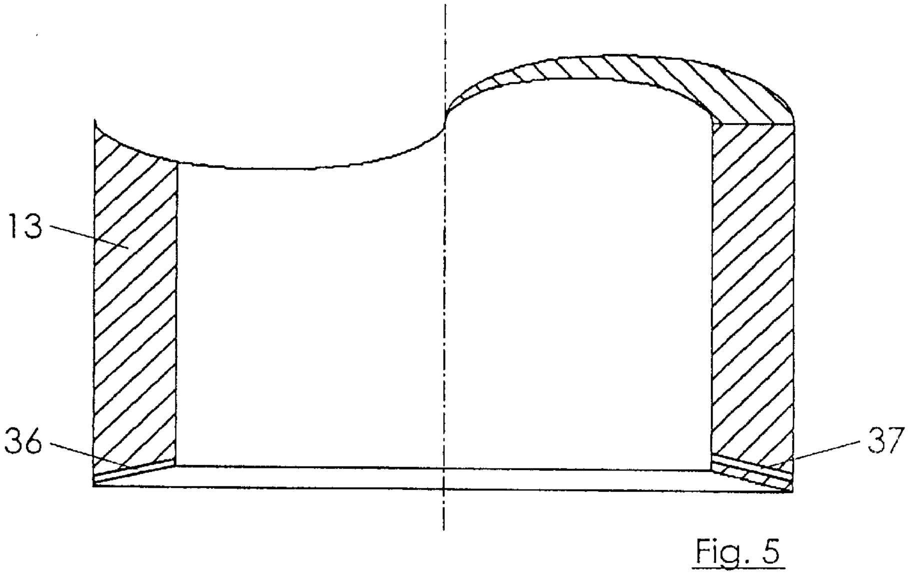
FIG. 5 is a detail view of the flow limiter.

FIG. 5 shows the flow limiter 13 in detail. At its end adjacent the combustion chamber, the flow limiter 13 has two times four bores 36 and 37. The bores 36 and 37 are disposed in two axially adjacent conical cross-sectional areas whose cone tips are disposed on the centerline 34 and which intersect the outer surface of the flow limiter 13 along circumferential lines within the valve housing 6. The bores 36 and the bores 37 are each angularly spaced by 90° and are displaced with respect to each other by 45°. They are arranged in the cylindrical flow limiter 13 so as to be inclined with respect to the center axis 34 such that they extend parallel to the closure cone 22. When the valve shaft 9 is lifted off the valve seat 20, the fluid contained in the annular space 23 under high pressure is ejected through the bores or passages 36 and 37 of the flow limiter 13 into the combustion chamber. In this way, an accurately defined fluid injection beam pattern is provided and an exact injection of fluid for example into the combustion chamber of an internal combustion engine is achieved.

Instead of bores as shown at 37 grooves may be provided in the conical front surface of the flow limiter 13 as shown for 36. The passages may be arranged in different axially spaced planes in order to provide for an exactly controlled ejection of fluid.

The invention is of course not limited to providing two times four bores or passages 36 and 37 as shown in FIG. 5, but other number of bores or grooves may be provided.

What is claimed is:

1. A valve for the dosed discharge of fluids, particularly a fuel injection valve for fuel injection systems of internal combustion engines, said valve comprising: an injector housing having opposite ends, a stack of piezo elements disposed in said injector housing at one end thereof and being adapted to be lengthened when a control voltage is applied thereto, a valve closing structure disposed in a valve housing at the other end of said injector and including a valve seat and a valve shaft having a closing structure normally seated on said valve seat, said valve shaft having a diameter smaller than said valve housing such that an annular gap is formed adjacent the front end of said injector housing between said valve shaft and the inner valve housing wall, a plunger disposed in said valve shaft and being movably supported in said injector housing, said plunger being disposed in engagement with said stack of piezo elements so as to be actuated thereby when said stack is lengthened by the application of said control voltage for actuating said valve closing structure to open said valve for the ejection of fluid from said valve housing, a valve shaft return structure disposed in said injector housing for biasing said valve shaft into a valve closing position, a tubular piezo element guide structure surrounding said stack of piezo elements and being disposed in said injector housing in spaced relation therefrom so as to form an annular passage for supplying fluid under pressure to said annular gap, a seal structure sealing said annular gap from said stack of piezo elements, said seal structure comprising a pressure compensation cylinder disposed between said valve shaft and said valve housing in sealing relationship therewith but being axially movable with said valve shaft, a tubular flow limiter seated on said valve shaft adjacent said valve closing structure, said tubular flow limiter having passages at its end adjacent said valve shaft closing structure for controlling the fluid discharge from said annular space.

2. A valve according to claim 1, wherein said valve closing structure comprises a shoulder formed on said valve shaft.

3. A valve according to claim 1, wherein said flow limiter is pressed into engagement with said shoulder by a spring arranged around said valve shaft and supported on a stop disposed on said valve shaft.

4. A valve according to claim 2, wherein said shoulder of said valve shaft has the shape of a closing cone which tapers down toward said valve shaft.

5. A valve according to claim 1, wherein said plunger has, at its end remote from said valve shaft closing structure, an end flange with an at least partially spherically rounded part disposed thereon for force transmitting coaxial engagement with said stack of piezo elements.

6. A valve according to claim 5, wherein, for an amplification of the valve lift movement during elongation of said stack of piezo elements, a motion transmission structure is arranged between said stack of piezo elements and said rounded part.

7. A valve according to claim 6, wherein said motion transmission structure comprises a pressure sleeve disposed adjacent said stack of piezo elements and a lever structure which is disposed between said spherically rounded part and said pressure sleeve and which amplifies an elongation movement of said stack of piezo element upon transmission of said movement to said plunger.

8. A valve according to claim 1, wherein fluid drain passages are provided for the release of fluid from the interior of said valve housing when said valve is closed, said drain passages being separated and sealed from said fluid supply passages by a pressure compensation cylinder and said piezo guide structure.

9. A valve according to claim 1, wherein said valve return structure comprises a spring arrangement disposed between said valve shaft and said valve housing for biasing said shoulder at the end of said valve shaft in sealing engagement with said valve seat.

10. A valve according to claim 2, wherein said valve return structure includes a surface arrangement wherein the surface area of said shoulder of said valve shaft which is exposed to the high pressure fluid at one end of said annular gap which is a high pressure fluid space and the surface of the compensation cylinder which is disposed at the opposite end of this high pressure fluid space are at such a size ratio that the fluid pressure force on said compensation cylinder substantially exceeds the fluid pressure force on said shoulder and said compensation cylinder is operatively connected to said valve shaft for transmitting said fluid pressure force to said valve shaft to provide a hydraulic valve closing force.

11. A valve according to claim 2, wherein said flow limiter includes, at its end adjacent said valve shaft shoulder, bores which limit fluid flow out of said valve.

* * * * *